(12) United States Patent
Hasegawa

(10) Patent No.: US 12,708,231 B2
(45) Date of Patent: Aug. 18, 2026

(54) PRESSURE COOKER

(71) Applicant: J.C. UNI-Tec, Inc., Gardena, CA (US)

(72) Inventor: Tom Hiroshi Hasegawa, Gardena, CA (US)

(73) Assignee: J.C. UNI-Tec, Inc., Gardena, CA (US)

( * ) Notice: Subject to any disclaimer, the term of this patent is extended or adjusted under 35 U.S.C. 154(b) by 851 days.

(21) Appl. No.: 17/652,999

(22) Filed: Mar. 1, 2022

(65) Prior Publication Data

US 2023/0276972 A1 Sep. 7, 2023

(51) Int. Cl.
*A47J 27/08* (2006.01)
*A47J 27/092* (2006.01)
*B25B 5/10* (2006.01)

(52) U.S. Cl.
CPC ......... *A47J 27/0811* (2013.01); *A47J 27/092* (2013.01); *B25B 5/101* (2013.01)

(58) Field of Classification Search
CPC .......................... A47J 27/0811; A47J 27/0813
See application file for complete search history.

(56) References Cited

U.S. PATENT DOCUMENTS 1,519,767 A * 12/1924 Demuth ............... A47J 27/0811 292/256
2,266,507 A * 12/1941 Neumann ................. B25B 5/14 269/249
3,619,473 A * 11/1971 Meyerhoff .............. H01L 24/72 174/138 R
5,632,403 A 5/1997 Deng
8,869,829 B2 10/2014 Hasegawa
2008/0290090 A1 11/2008 Kindler et al.
2013/0199633 A1* 8/2013 Hasegawa ............. F16K 15/063 137/511
2014/0373729 A1 12/2014 Kim et al.
(Continued)

FOREIGN PATENT DOCUMENTS

CH 237600 A * 5/1945 .......... A47J 27/0811
CH 244416 A * 9/1946 .......... A47J 27/0811
CN 108606645 A * 10/2018 .............. A47J 36/12
(Continued)

OTHER PUBLICATIONS

DE 652009 C (Roeder) Oct. 23, 1937 [retrieved Mar. 8, 2025]. Retrieved from Espacenet, translation by EPO and Google. (Year: 1937).*
(Continued)

*Primary Examiner* — John J Norton
(74) *Attorney, Agent, or Firm* — Buchalter LLP

(57) ABSTRACT

A pressure cooker is provided. The pressure cooker comprises a base comprising a bottom and at least one sidewall extending from a perimeter of the bottom, a base flange extending about a perimeter of the at least one sidewall opposite the bottom, the bottom and the at least one sidewall defining, at least in part, an interior of the base; and a lid hingedly coupled to the base such that the lid is moveable between an open position that allows access to the interior of the base and a closed position that prevents access to the interior of the base, the lid comprising a lid flange about its perimeter. The pressure cooker further comprises one or more of a pressure release assembly; a spring-loaded hinge assembly; or a clamp assembly.

10 Claims, 11 Drawing Sheets

(56) References Cited

U.S. PATENT DOCUMENTS

Figure 1A:
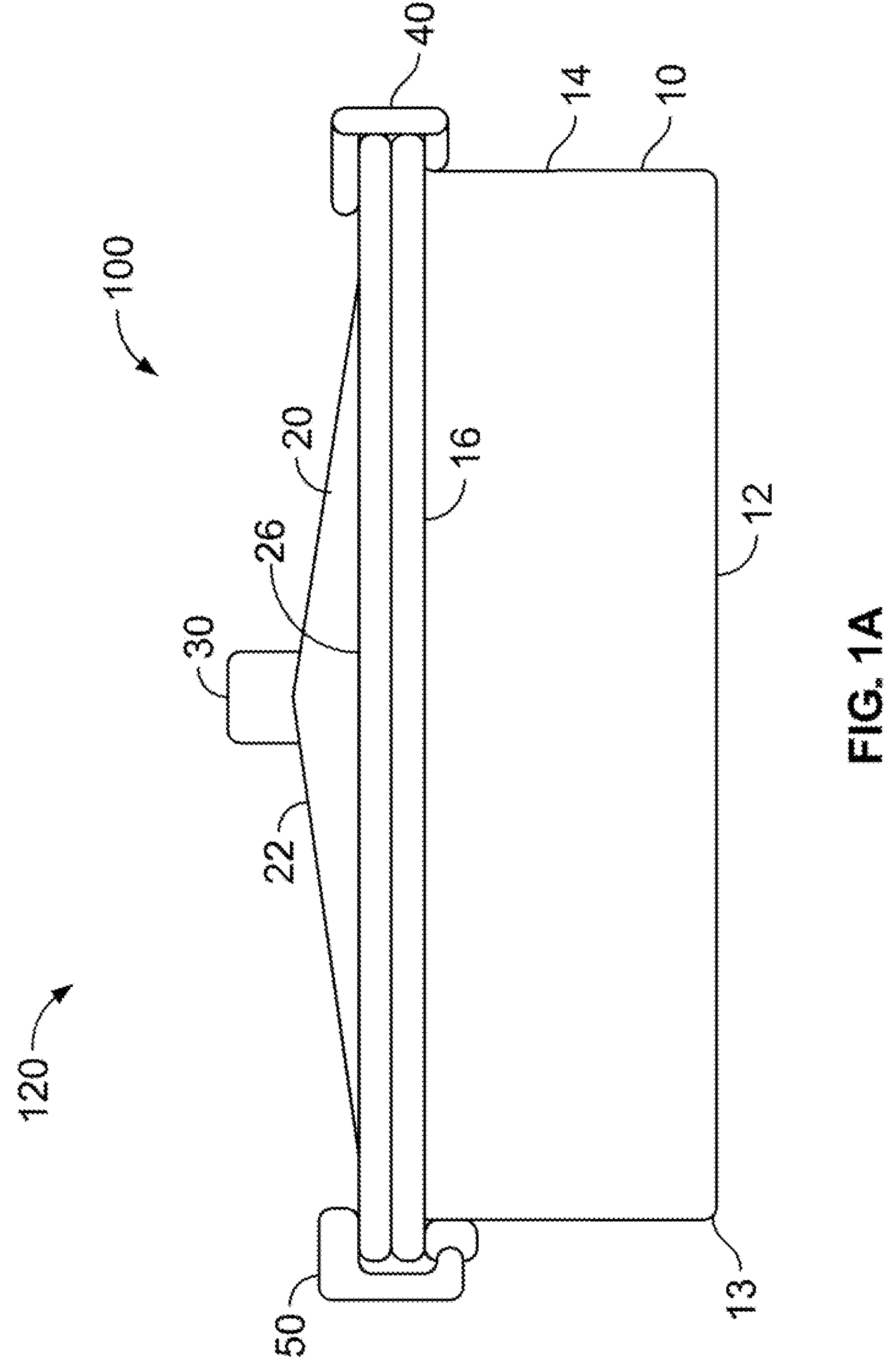

| | | | |
|---|---|---|---|
| 2018/0332994 | A1 | 11/2018 | Hasegawa |
| 2021/0113008 | A1 | 4/2021 | Luce et al. |

FOREIGN PATENT DOCUMENTS

| | | | | | |
|---|---|---|---|---|---|
| DE | 511971 | C | * | 11/1930 | .......... A47J 27/0811 |
| DE | 652009 | C | * | 10/1937 | .......... A47J 27/0811 |
| FR | 1051706 | A | * | 1/1954 | .......... A47J 27/0811 |
| GB | 1249342 | A | * | 10/1971 | ............. B25B 5/101 |
| JP | S03-003642 | Y | | 4/1928 | |
| JP | S10-004891 | Y | | 4/1935 | |
| JP | S14-006180 | Y | | 5/1939 | |
| JP | 2008029837 | A | | 2/2008 | |
| KR | 910009541 | Y1 | * | 12/1991 | ............ A47J 27/092 |
| KR | 10-2007-0093180 | | | 9/2007 | |

OTHER PUBLICATIONS

KR 91-0009541 Y1 (Kim, Yong-Jin et al.) Dec. 13, 1991 [retrieved Mar. 8, 2025]. Retrieved from Foreign Image and Text database, translation by Clarivate Analytics. (Year: 1991).*

KR 2007-0093180 A (Lim, Byung-taek) Sep. 18, 2007 [retrieved on Jul. 10, 2025]. Retrieved from Foreign Image and Text database, translation by Clarivate Analytics. (Year: 2007).*

CN 108606645 A (Fu, Zheng-ting et al.) Oct. 2, 2018 [retrieved on Nov. 22, 2025]. Retrieved from Foreign Image and Text database, translation by Clarivate Analytics. (Year: 2018).*

WIPO Application No. PCT/US2023/014075, PCT International Search Report and Written Opinion of the International Searching Authority mailed Feb. 28, 2023.

J.C. Uni-Tec, Inc.; Office Action for Japanese Patent Application No. 2024552362, mailed Aug. 12, 2025, 10 pgs.

Examination Report for New Zealand Patent Application No. 813812 dated Feb. 10, 2026, 4 Pages.

Office Action for Australian Application No. AU2023228814, dated Dec. 22, 2025, 3 pages.

Supplementary European Search Report for European Application No. 23763847.3, mailed Dec. 5, 2025, 07 Pages.

Office Action for Canadian Application No. CA3244037, dated May 7, 2026, 4 Pages.

Office Action for Korean Application No. 1020247032111, dated May 30, 2026, 6 Pages.

* cited by examiner

PRESSURE COOKER

TECHNICAL BACKGROUND

Various embodiments relate to pressure cookers, pressure release assemblies (such as a pressure release assembly for a pressure cooker, for example), spring-loaded hinge assemblies (such as a spring-loaded hinge assembly for a pressure cooker, for example), and/or clamping assembly (such as a clamping assembly for a pressure cooker, for example).

BACKGROUND

A pressure cooker uses high-temperature and high-pressure steam to cook the food inside a cooking pot (or inside the cooking cavity). To maintain the high-temperature and high-pressure steam within the cooking pot during use of the pressure cooker, the lid of the pressure cooker is clamped onto the base of the pressure cooker. Additionally, a pressure release valve may be used to release excess pressure from within the cooking pot during use.

BRIEF SUMMARY

Various embodiments provide pressure cookers comprising at least one of a pressure release assembly, a spring-loaded hinge assembly, or a clamping assembly. Various embodiments provide pressure release assemblies that may be incorporated into pressure cookers, for example. Various embodiments provide spring-loaded hinge assemblies that may be incorporated into pressure cookers, for example. Various embodiments provide pivotable clamping assemblies that may be incorporated into pressure cookers, for example.

According to an aspect of the present disclosure, a pressure cooker is provided. In an example embodiment, the pressure cooker comprises a base and a lid.

In an example embodiment, the base comprises a bottom and at least one sidewall extending from a perimeter of the bottom. The base further comprises a base flange extending about a perimeter of the at least one sidewall opposite the bottom. The bottom and the at least one sidewall defines, at least in part, an interior of the base.

In an example embodiment, the lid is hingedly coupled to the base such that the lid is moveable between an open position that allows access to the interior of the base and a closed position that prevents access to the interior of the base. The lid comprising a lid flange about its perimeter.

In an example embodiment, the pressure cooker further comprises one or more of a pressure release assembly, a spring-loaded hinge assembly, or a clamp assembly.

In an example embodiment, the pressure release assembly comprises an intake tube in communication with the interior of the base when the lid is in the closed position; a pressure outlet tube in communication with the intake tube at a first end thereof and having a pressure outlet portion at a second end thereof, the first end opposite the second end; an internal pressure release casing configured to be connected to the pressure outlet portion and comprising a spring casing and a plunger cavity; a valve plunger comprising a shaft portion and a beveled valve end, the beveled valve end aligned with an opening of the pressure outlet portion when the valve plunger is disposed within the plunger cavity; a coil spring disposed within the spring casing and coupled at a first spring end to the valve plunger; and an external pressure release casing coupled to a second spring end of the coil spring and disposed external to the internal pressure release casing, the external pressure release casing and the internal pressure release casing coupled to one another via respective mated threads.

In an example embodiment, the spring-loaded hinge assembly comprises at least one first bracket coupled to the at least one sidewall and comprising a first tensioning bar; a spring axle coupled to the at least one first bracket; at least two hinge springs, each of the at least two hinge springs comprises a respective coil of material forming a respective central opening, the respective coil of material having a first coil end and a second coil end, wherein the first coil end and the second coil end extend out from the coil of material, the at least two hinge springs disposed such that the spring axle extends through the respective central opening of each of the at least two hinge springs and such that the first coil end of a first of the at least two hinge springs and the first coil end of a second of the at least two hinge springs rest proximate one another against the first tensioning bar; and at least one second bracket coupled to an exterior surface of the lid and hingedly coupled to the at least one first bracket via the spring axle such that the at least one second bracket and the lid coupled thereto are moveable between the open position and the closed position, the at least one second bracket comprising a second tensioning bar, the at least two hinge springs disposed such that the second coil end of the first of the at least two hinge springs and the second coil end of the second of the at least two hinge springs rest spaced apart from one another against the second tensioning bar.

In an example embodiment, the clamp assembly comprises a clamp bracket coupled to the at least one sidewall of the base, the clamp bracket comprising a through hole that defines a through axis and an elongation axis, the shape of the through hole in a plane perpendicular to the through hole axis comprising a wide portion and a narrow portion, the wide portion and the narrow portion aligned along the elongation axis; a clamp axle extending in a first direction that is substantially parallel to the through hole axis, a cross-section of the clamp axle taken perpendicular to the first direction having a first dimension (D1) and a second dimension (D2), the second dimension being smaller than the first dimension (D2<D1) such that when the clamp axle is disposed within the through hole of the clamp bracket, the clamp axle can rotate when the clamp axle is disposed within the wide portion of the through hole and the clamp axle cannot rotate when the clamp axle is disposed within the narrow portion of the through hole; a C-shaped bracket coupled to the clamp bracket by the clamp axle such that the C-shaped bracket is rotatably engaged with the clamp bracket when the clamp axle is disposed within the wide portion of the through hole and is non-rotatably engaged with the clamp bracket when the clamp axle is disposed within the narrow portion of the through hole; and an engagement element configured to engage a surface of the lid flange, the engagement element being selectively moveable so as to cause the C-shaped bracket to be positioned such that the clamp axle is disposed in the narrow portion of the through hole, thereby causing the clamp assembly to be in a locked arrangement and so as to enable the C-shaped bracket to be positioned such that the clamp axle is disposed in the wide portion of the through hole, thereby allowing the clamp assembly to be in an unlocked arrangement or a released arrangement.

In an example embodiment, the narrow portion of the through hole of the clamp bracket extends a height A along the elongation axis and the lid flange and the base flange define a combined height B along the elongation axis, with the combined height B being greater than the height A.

In an example embodiment, the engagement element comprises a user engagement portion, an adjusting component, and toggle pad, wherein the user engagement portion is coupled to a first end of the adjusting component, a second end of the adjusting component is a rounded end, the rounded end is disposed within a receiving chamber of the toggle pad, and the receiving chamber has curved or angled walls.

In an example embodiment, the rounded end comprises one or more pegs extending out therefrom.

In an example embodiment, the receiving chamber comprises one or more pegs holes each configured to receive a respective one of the one or more pegs therein.

In an example embodiment, the one or more peg holes are each larger than the respective one of the one or more pegs such that the adjusting component and the toggle pad can rotate or pivot within a particular angular range with respect to one another.

In an example embodiment, the engagement element comprises an adjusting component coupled to a toggle pad such that the toggle pad is able to pivot and/or rotate with respect to the adjusting component.

In an example embodiment, the adjusting component is a threaded rod.

In an example embodiment, the adjusting component is disposed at least partially within an arm hole in an arm of the C-shaped bracket, the arm hole having a threaded interior surface configured to mate with the threads of the adjustment component.

In an example embodiment, to transition the clamping assembly between the locked arrangement and the unlocked arrangement and/or released arrangement the adjusting component is rotated with respect to the C-shaped bracket to adjust a length of the adjusting component disposed between the arm of the C-shaped clamp bracket and the lid flange.

In an example embodiment, the toggle pad comprises an engaging surface that is configured to engage the exterior surface of the lid, and wherein the engaging surface has a concave topology.

In an example embodiment, a topology of the engaging surface is configured to change from a concave topology when the engagement surface is not engaged with the exterior surface of the lid to a planar topology when the engagement surface is engaged with the exterior surface of the lid.

In an example embodiment, the spring-loaded hinge assembly further comprises a divider disposed between the first coil end of the first one of the at least two hinge springs and the first coil end of the second one of the at least two hinge springs.

In an example embodiment, the first coil end of the first one of the at least two hinge springs and the first coil end of the second one of the at least two hinge springs abut opposing surfaces of the divider.

In an example embodiment, the pressure release assembly is configured to release pressure from the interior of the base when the pressure within the interior surpasses a threshold pressure and wherein the threshold pressure is determined based on a relative position of the external pressure release casing with respect to the internal pressure release casing.

In an example embodiment, changing the relative position of the external pressure release casing with respect to the internal pressure release casing causes the coil spring to be compressed or stretched such that a force applied to the valve plunger by the coil spring is modified by an amount that is proportional to a change in the relative position of the external pressure release casing with respect to the internal pressure release casing that is substantially parallel to an axis of the plunger cavity.

In an example embodiment, a surface of the internal pressure release casing comprises a set of indicia and wherein one or more indicia of the set of indicia that are at least partially exposed by the external pressure release casing indicates the threshold pressure.

In an example embodiment, an index of the one or more indicia that is intersected by a plane defined by an indicating surface of the external pressure release casing corresponds to the threshold pressure.

In an example embodiment, rotation of the external pressure release casing with respect to the lid and the internal pressure release casing causes the change in the relative position of the external pressure release casing with respect to the internal pressure release casing that is substantially parallel to an axis of the plunger cavity.

In an example embodiment, the second spring end of the coil spring is coupled to the external pressure release casing (directly or via the external pressure release casing being coupled to the valve plunger and the valve plunger being coupled to the second spring end) such that rotating the external pressure release casing via the respective mated threads causes a compression or stretch of the coil spring to be changed.

BRIEF DESCRIPTION OF THE SEVERAL VIEWS OF THE DRAWING(S)

Figure 1B:
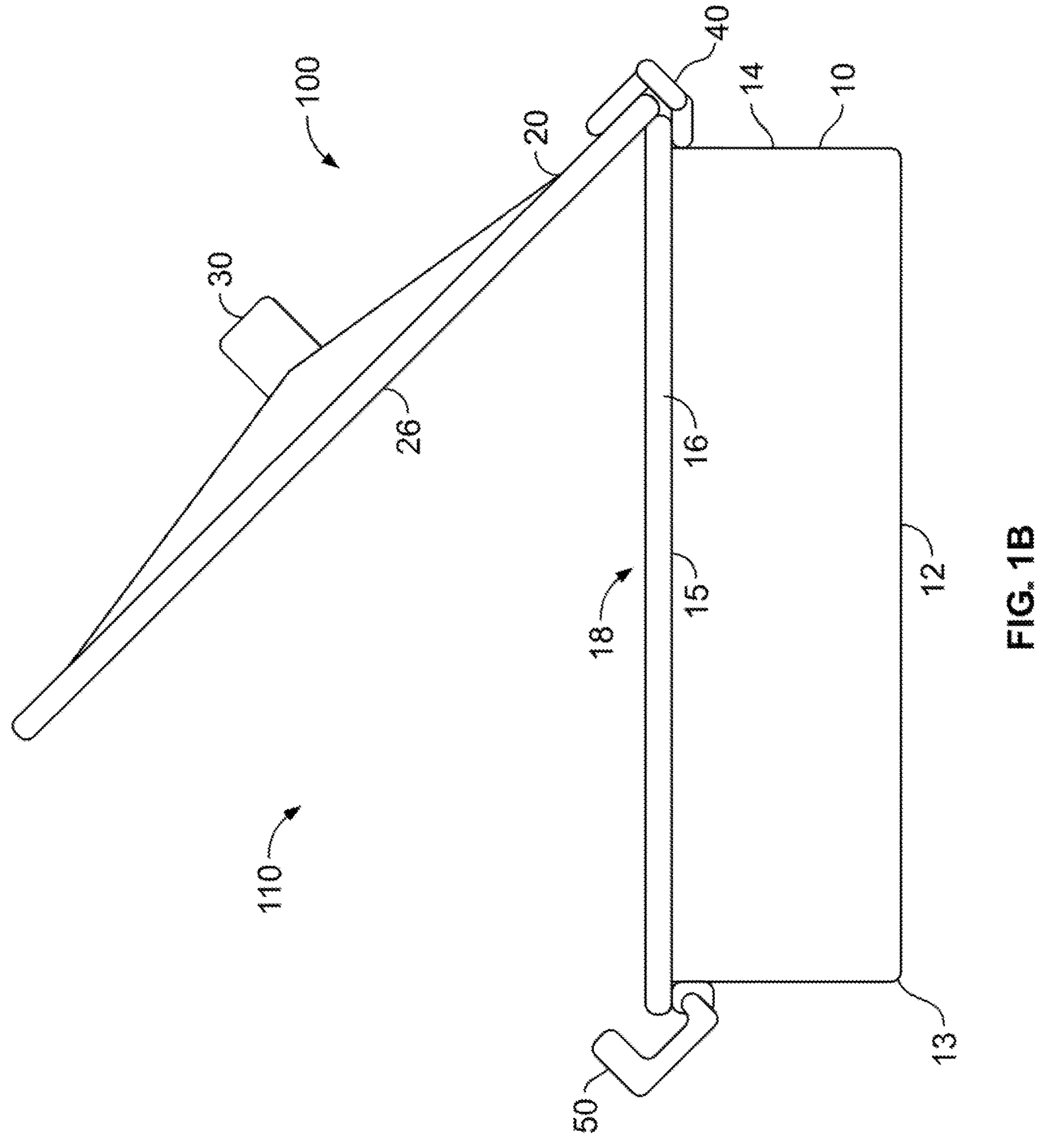
Figure 2:
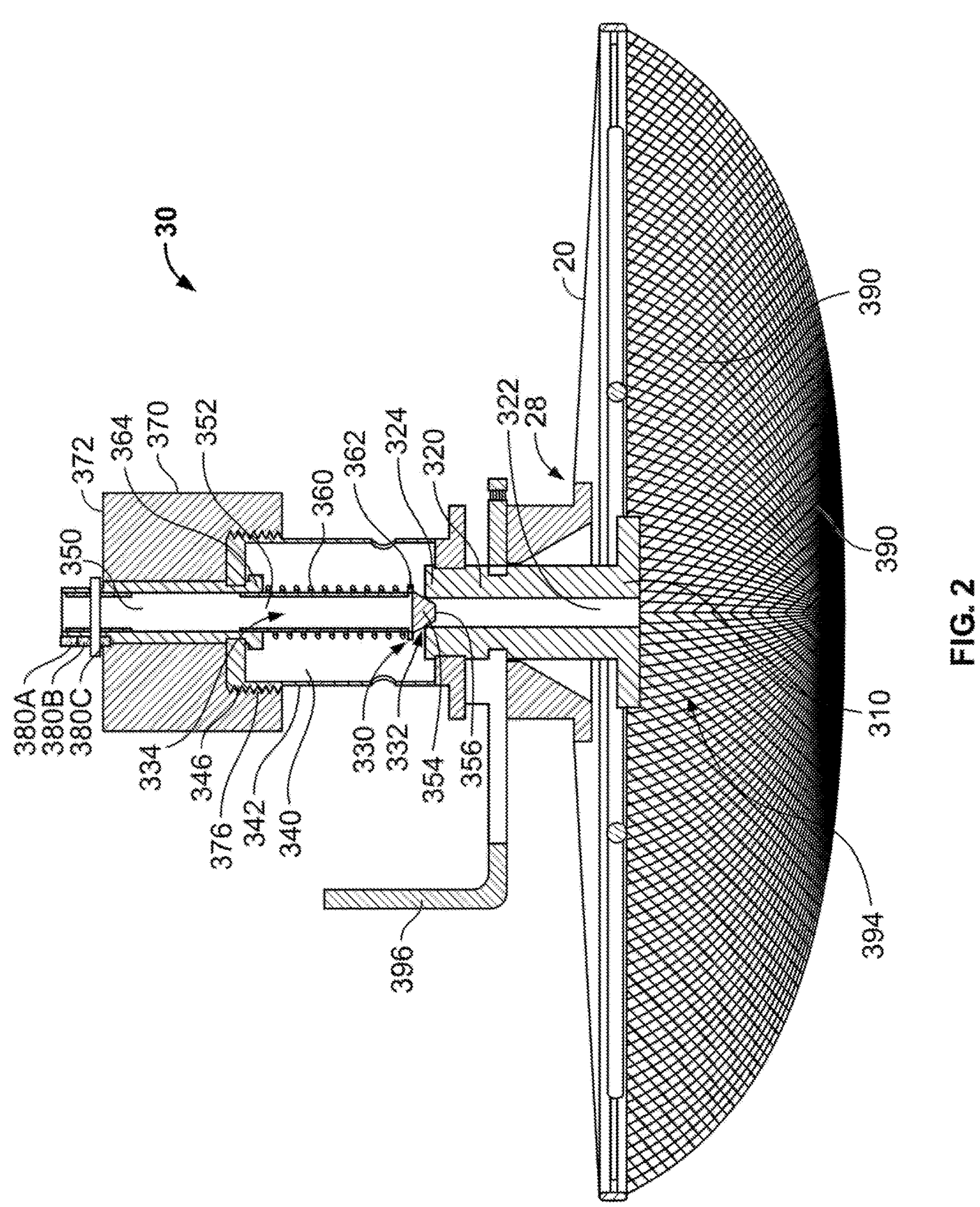
Figure 3:
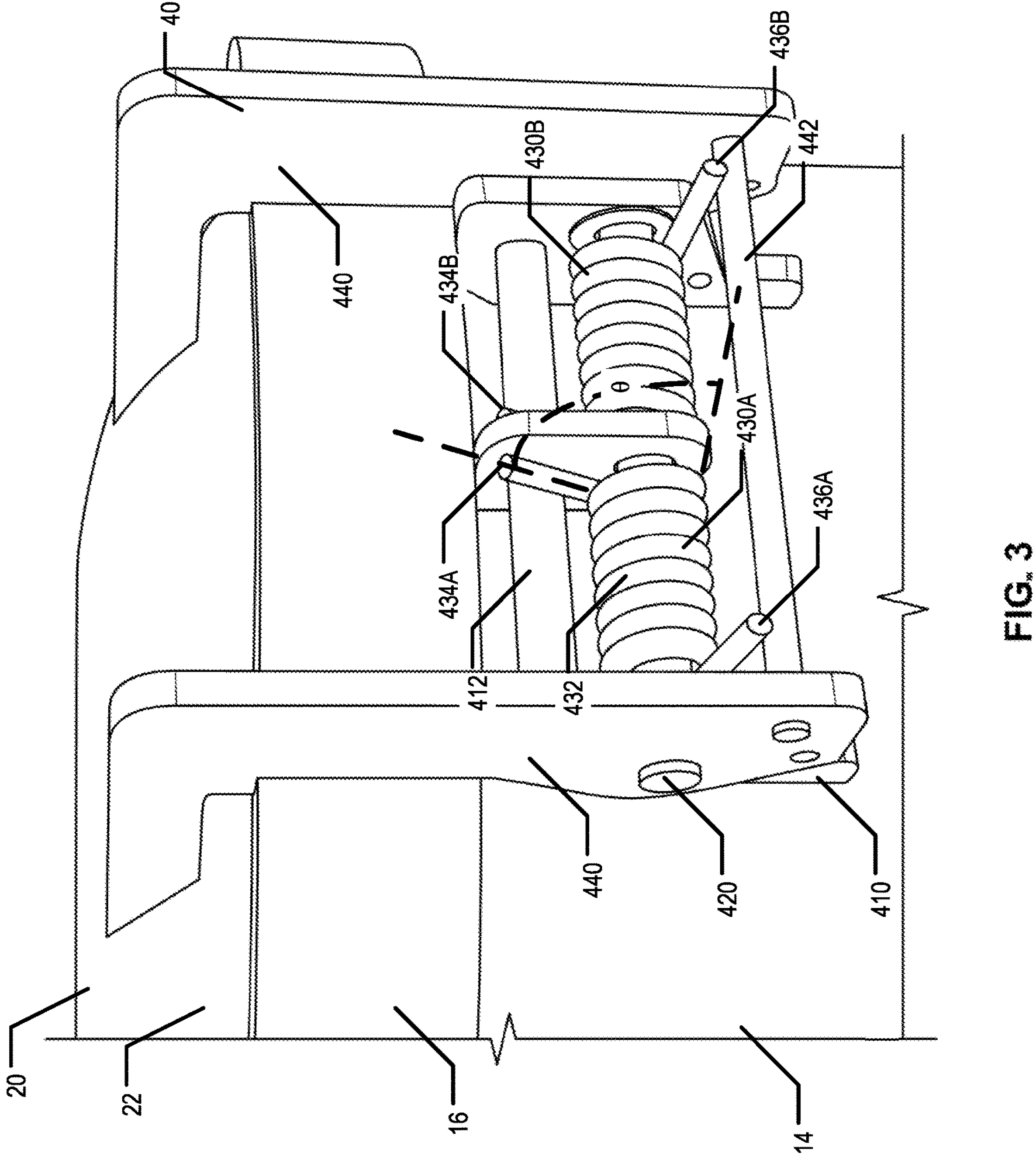
Figure 4:
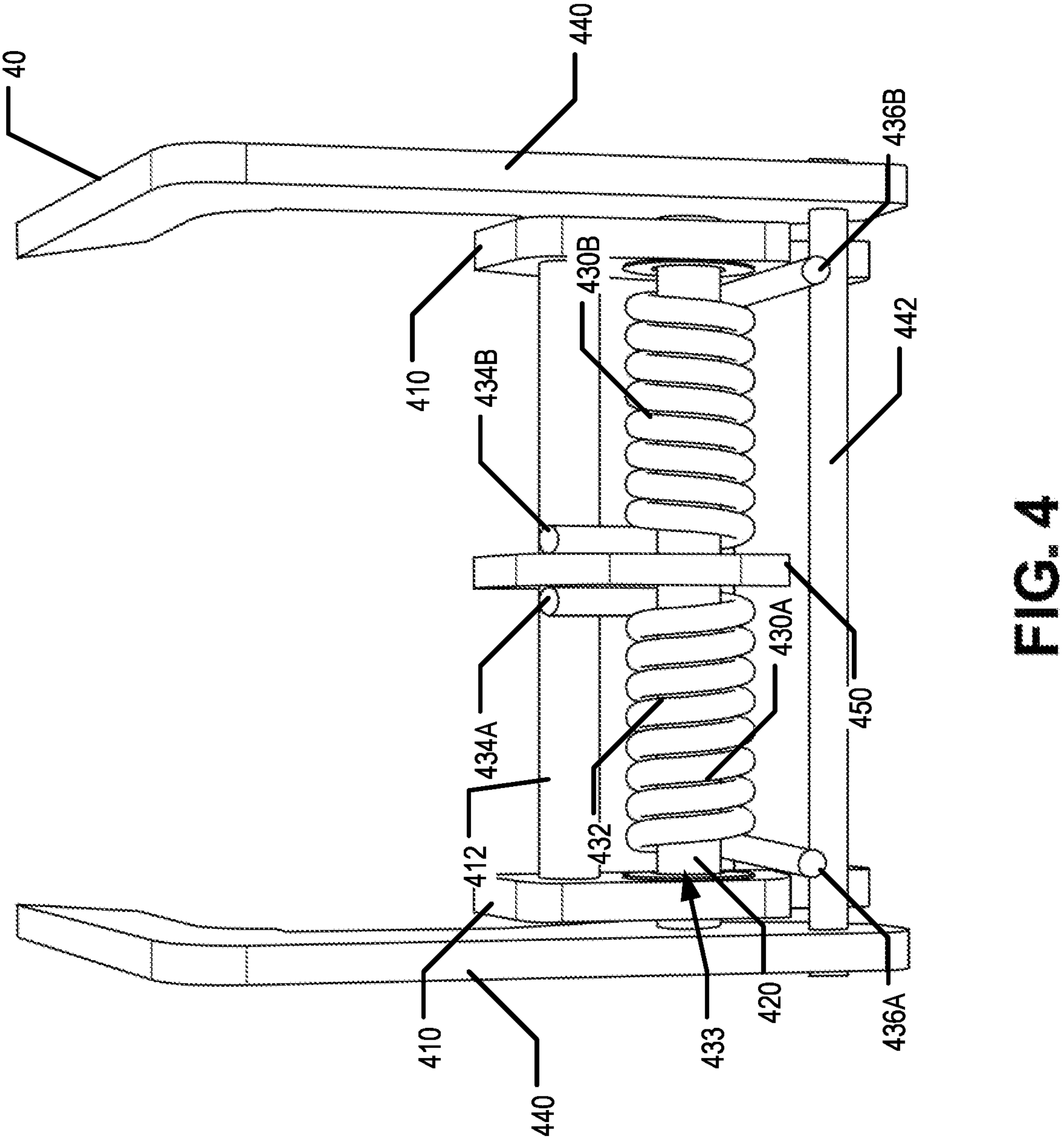
Figure 5:
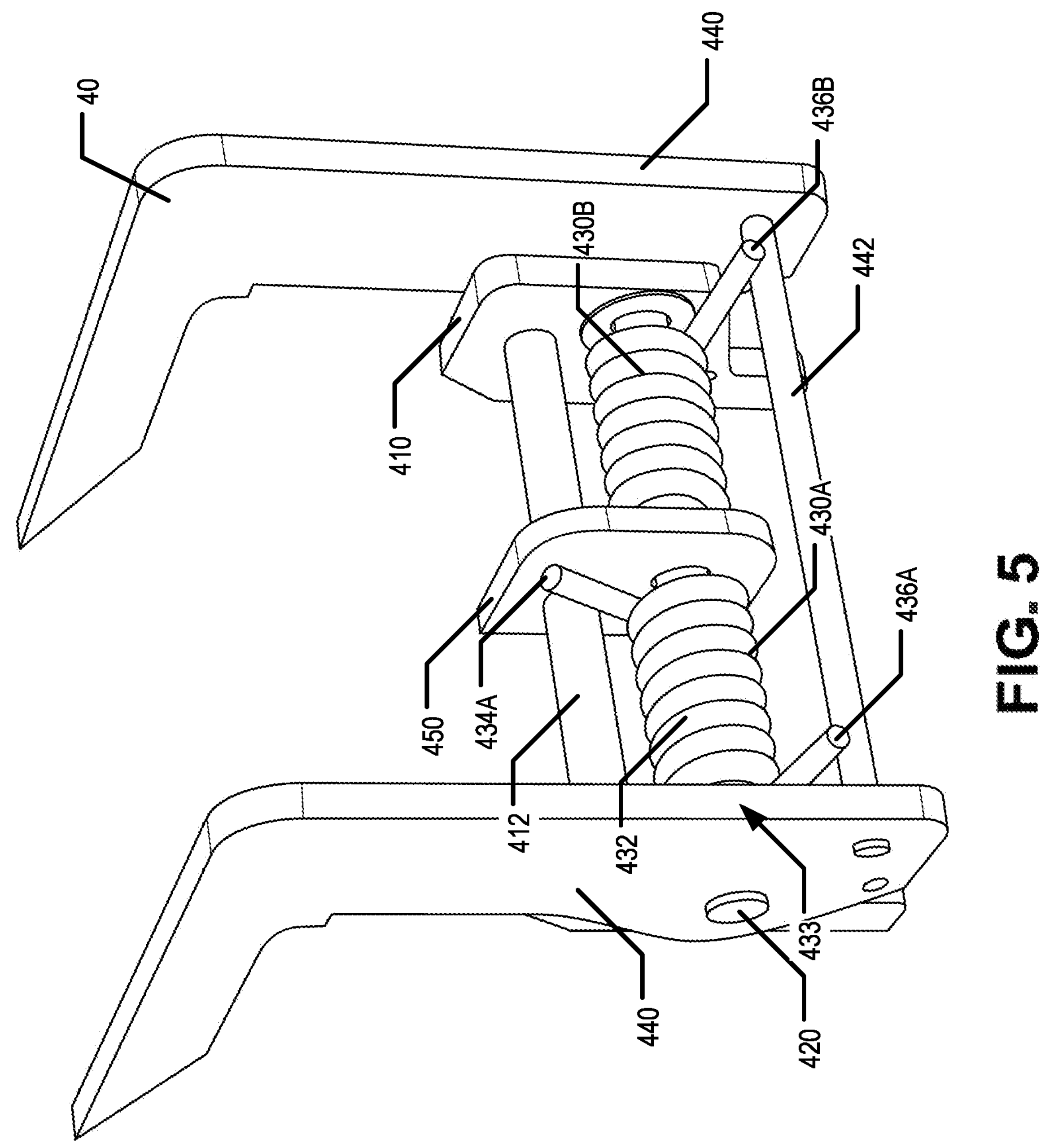
Figure 6A:
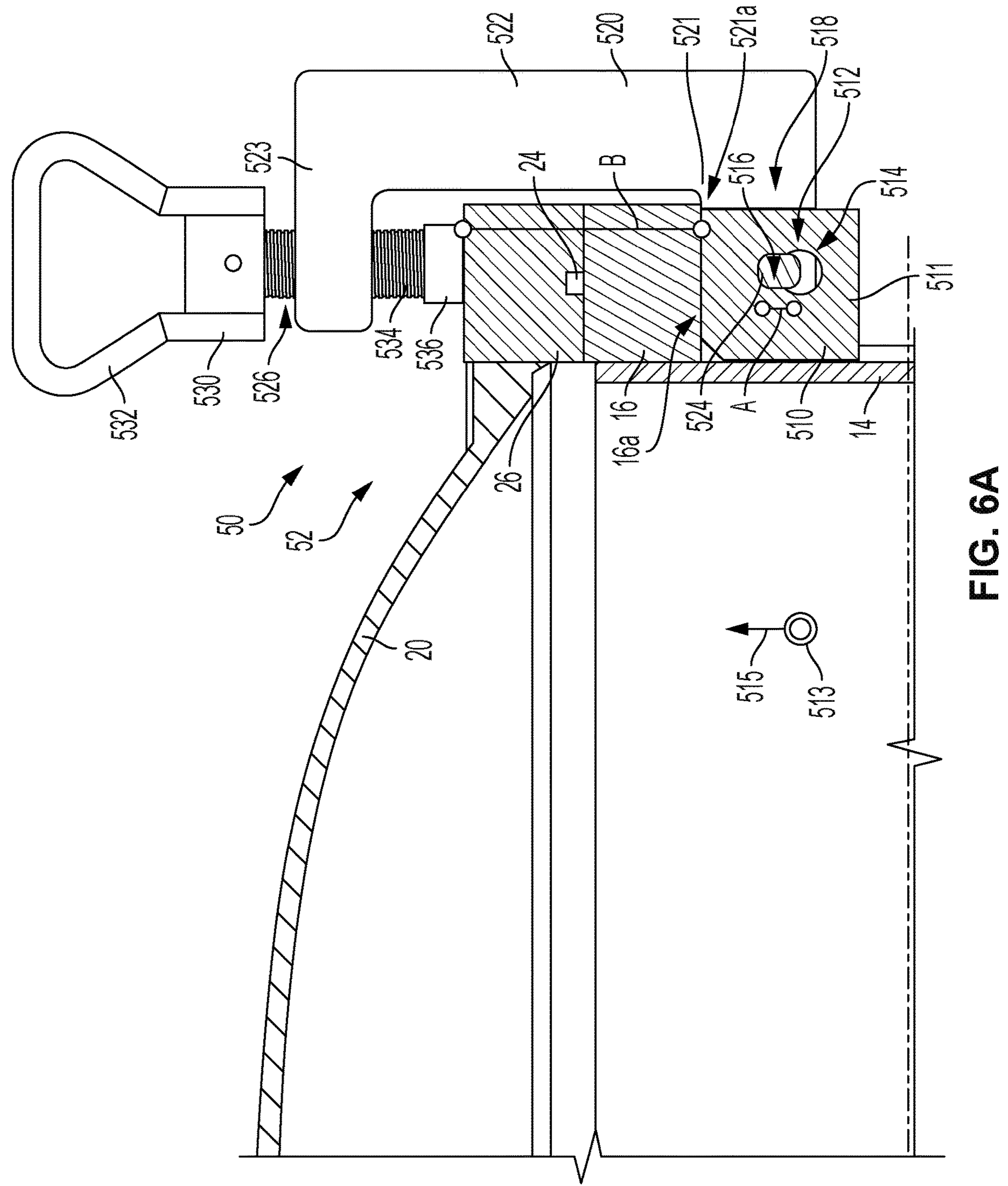
Figure 6B:
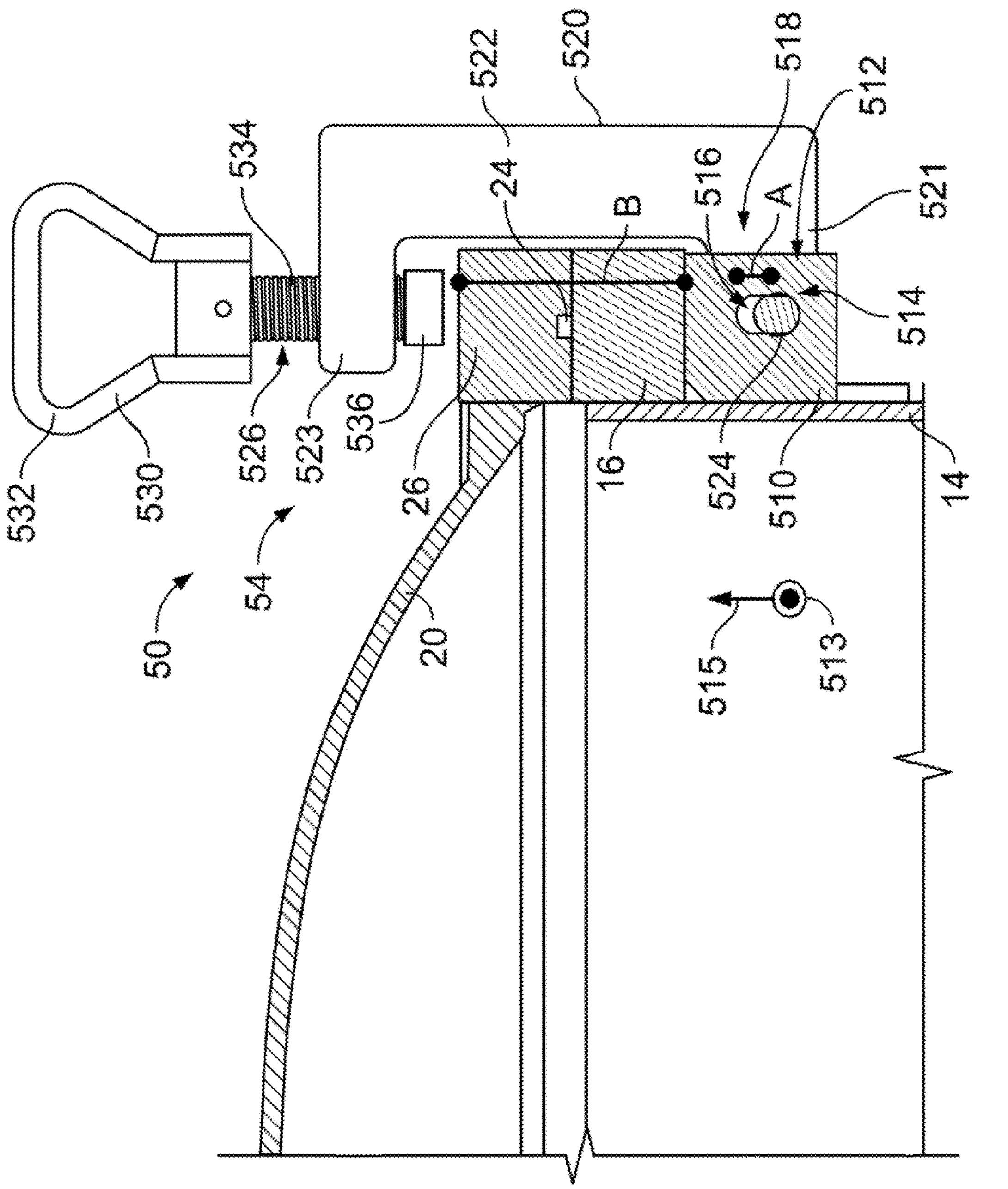
Figure 6C:
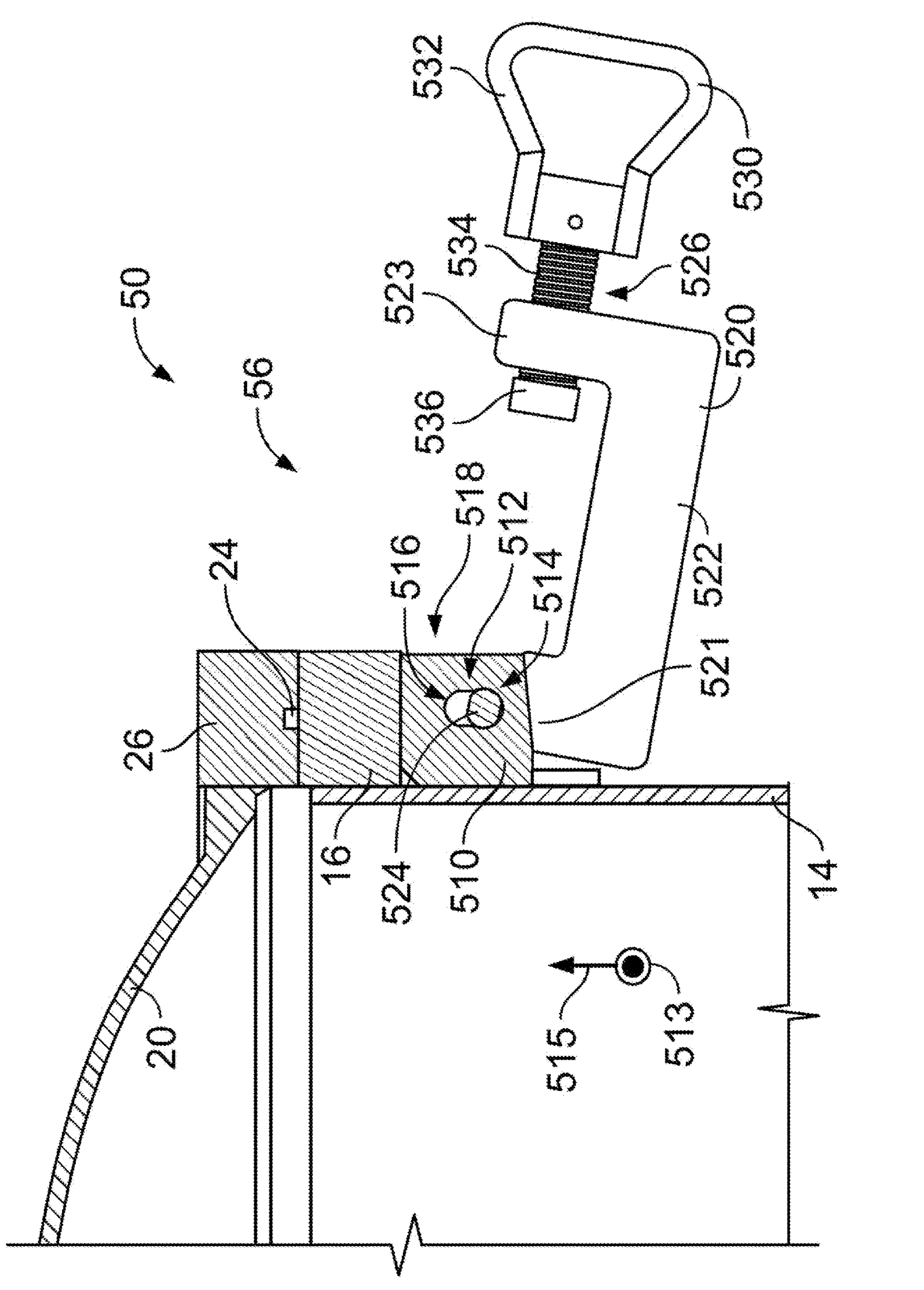
Figure 6D:
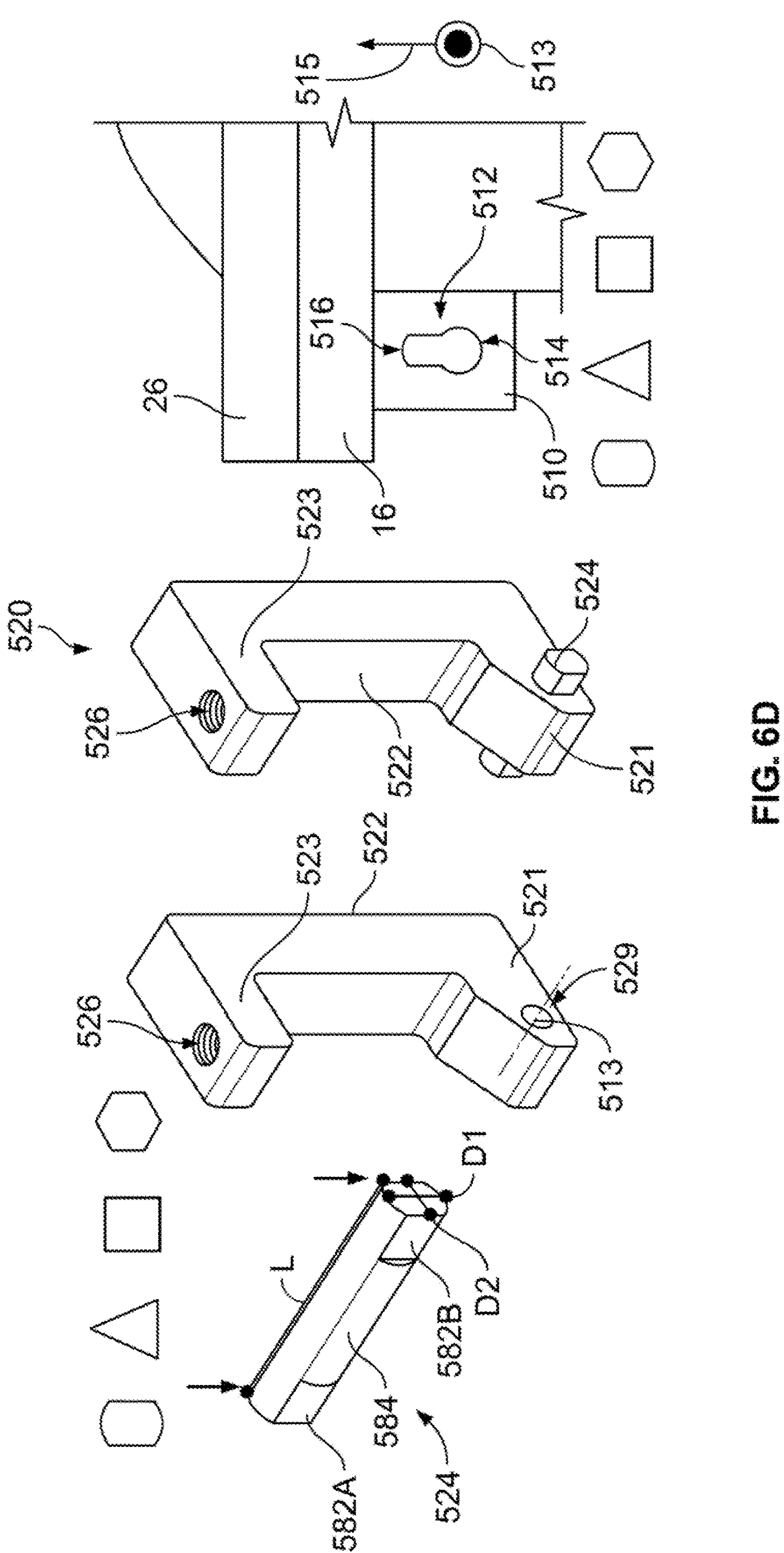
Figure 7:
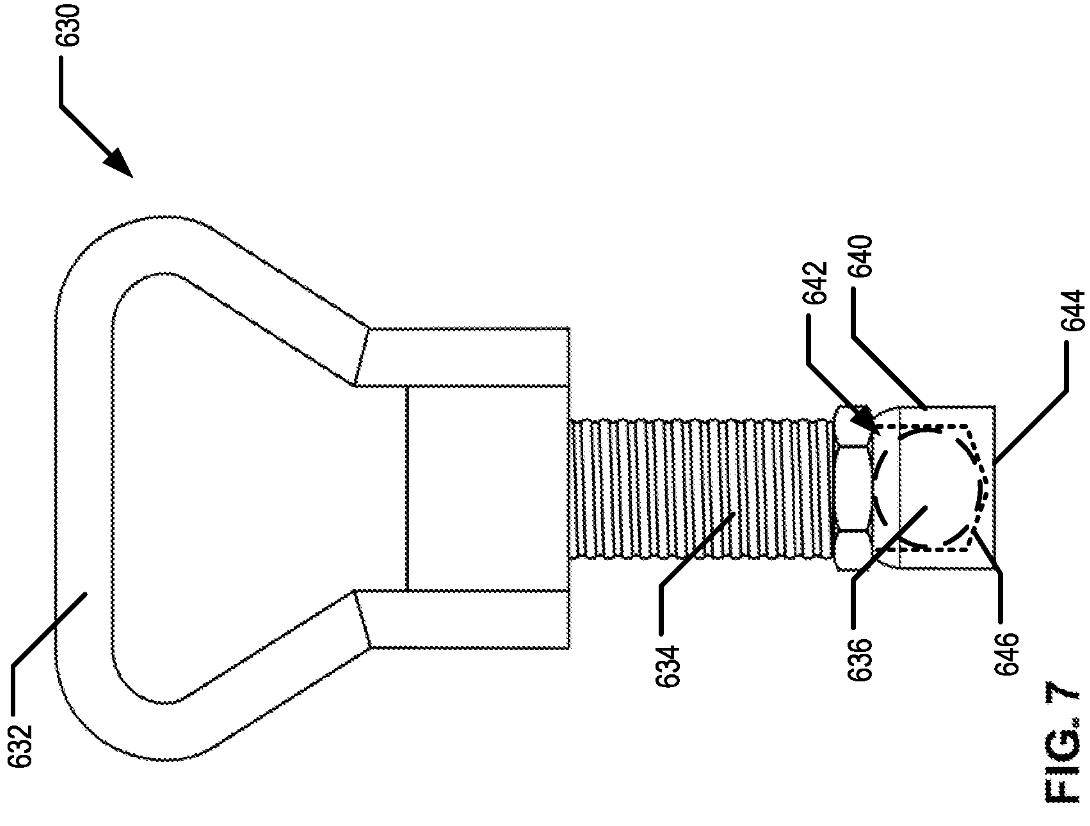

Having thus described the invention in general terms, reference will now be made to the accompanying drawings, which are not necessarily drawn to scale, and wherein:

FIG. 1A provides a side view of an example pressure cooker having a lid in a closed position, according to an example embodiment;

FIG. 1B provides a side view of the example pressure cooker shown in FIG. 1A with the lid in an open position, according to an example embodiment;

FIG. 2 provides a cross-sectional view of a pressure release assembly, according to an example embodiment;

FIG. 3 provides a perspective view of an example spring-loaded hinge assembly, according to an example embodiment;

FIG. 4 provides a front view of another example spring-loaded hinge assembly, according to an example embodiment;

FIG. 5 provides a perspective view of the example spring-loaded hinge assembly shown in FIG. 4;

FIG. 6A provides a partial cross-sectional view of an example clamping assembly in a locked arrangement, according to an example embodiment;

FIG. 6B provides a partial cross-sectional view of the example clamping assembly shown in FIG. 6A in a unlocked arrangement, according to an example embodiment;

FIG. 6C provides a partial cross-sectional view of the example clamping assembly shown in FIG. 6A in an released arrangement, according to an example embodiment;

FIG. 6D illustrates various views of portions of the example clamping assembly shown in FIG. 6A, according to an example embodiment; and FIG. 7 provides a partially exploded cross-sectional view of an example clamping assembly, according to an example embodiment.

DETAILED DESCRIPTION

Various embodiments now will be described more fully hereinafter with reference to the accompanying drawings, in which some, but not all embodiments are shown. Indeed, these embodiments may be embodied in many different forms and should not be construed as limited to the embodiments set forth herein; rather, these embodiments are provided so that this disclosure will satisfy applicable legal requirements. Like numbers refer to like elements throughout.

Pressure cookers are used to cook food and/or to perform other processes in high-temperature and high-pressure environments. Various embodiments described herein provide a pressure release assembly configured to release excess steam and/or pressure from within the pressure cooker. Various embodiments provide spring-loaded hinge assemblies configured to aid a user in opening a pressure cooker (e.g., moving the lid from the closed position to the open position) after the pressure cooker has cooled (which may cause the pressure within the pressure cooker to be smaller than the ambient pressure exterior to the pressure cooker). Various embodiments provide pivotable clamping assemblies configured to maintain the lid of the pressure cooker in the closed position, even when the pressure within the pressure cooker is high.

FIG. 1A provides side view of a pressure cooker 100 with the lid 20 in a closed position 120. FIG. 1B provides a side view of the pressure cooker 100 with the lid 20 in an open position 110. The pressure cooker comprises a base 10 and a lid 20. The base 10 comprises a bottom 12 and at least one sidewall 14 extending from a perimeter 13 of the bottom 12 substantially upward. The at least one sidewall 14 and the bottom 12 at least partially define an interior 18 of the base 10. For example, the interior 18 of the base 10 is a cavity or opening where the food is placed for cooking. For example, the base 10 is the cooking pot of the pressure cooker 100, in an example embodiment.

The base 10 further comprises a base flange 16 extending about an upper perimeter 15 of the at least one sidewall 14. The upper perimeter 15 of the at least one sidewall is located opposite the portion of the at least one sidewall 14 located adjacent the bottom 12. For example, the base flange 16 is spaced apart from the perimeter 13 of the bottom 12 by the at least one sidewall 14.

In various embodiments, the at least one sidewall 14 may consist of one sidewall which forms a circular or elliptical cross-section in a horizontal plane (e.g., the bottom 12 may be shaped as a circle or an ellipse). In various embodiments, the at least one sidewall 14 may consist of multiple sidewalls (e.g., four sidewalls) that from a polygonal cross-section (e.g., square or rectangular) in a horizontal plane (e.g., the bottom 12 may be shaped as a polygon). Various other shapes 12 of the bottom or the cross-section of the at least one sidewall 14 in a horizontal plane may be used in various other embodiments.

In various embodiments, the bottom 12, at least one sidewall 14, and/or base flange 16 are made of metal (e.g., stainless steel, aluminum, and/or the like), though other embodiments may use various other materials.

The pressure cooker 100 further comprises a lid 20. The lid 20 is hingedly coupled to the base 10 such that the lid 20 is moveable between the open position 110 (in which access to the interior 18 of the base 10 is enabled) and the closed position 120 (in which access to the interior 18 of the base 10 is prevented). The lid comprises a lid flange 26 about its perimeter. In various embodiments, the shape of the lid 20 is configured such that the lid flange 26 is similar and/or substantially the same as the base flange 16 in size and shape. For example, the lid flange 26 and the base flange 16 are configured to engage with one another (with an at least semi-pliable and/or semi-elastic seal therebetween, in various embodiments) to seal the interior 18 of the base 10 when the lid 20 is in the closed position 120.

In various embodiments, the lid 20 is hingedly coupled to the base 10 by a spring-loaded hinge assembly 40. In various embodiments, a pressure release assembly 30 is at least partially disposed in the lid 20. In various embodiments, a clamping assembly 50 is used to secure the lid 20 in the closed position 120.

Example Pressure Release Assembly

A user may use a pressure cooker to (serially) cook a variety of food and/or perform a variety of high-temperature and high-pressure processes. Different foods and/or different high-temperature and high-pressure processes may require different pressures (e.g., different maximum pressures within the interior of the pressure cooker). As such, a pressure cooker 100 may be configured enable a user to set, select, and/or configure a threshold pressure and/or threshold pressure range such that when the pressure in the interior of the pressure cooker exceeds this threshold pressure and/or threshold pressure range, the excess pressure is released. Therefore, there is a technical problem relating to how to enable a user to set, select, and/or configure the threshold pressure and/or threshold pressure range in a manner that is easy to use, and allows a user to repeatedly select an appropriate threshold pressure and/or threshold pressure range. In particular, technical problems exist relating to providing a user friendly user interface that is reliable and provides accurate indication of the set, selected, and/or configured threshold pressure and/or threshold pressure range.

Various embodiments of the present disclosure provide technical solutions to the above-noted technical problem. In particular, the user interface of the pressure release assembly comprises a external pressure release casing that can be rotated to allow a user to set, select, and/or configure the pressure threshold and/or pressure threshold range and a plurality of clearly distinguishable indicia such that the user can easily and repeatedly set, select, and/or configure the pressure threshold and/or pressure threshold range as required and/or desired. For example, in various embodiments, the size and configuration of the external pressure release casing and the internal pressure release casing enable a user to easily and reliably set, select, and/or configure the pressure threshold and/or pressure threshold range as required and/or desired.

In various embodiments, the pressure release assembly 30 is configured to release excess pressure and/or steam from the interior 18 of the base 10. In various embodiments, the pressure release assembly 30 is configured such that a user may, through interaction with an external pressure release casing of the pressure release assembly 30, set a pressure threshold. For example, in various embodiments, the pressure threshold is a user-configurable pressure threshold. When the pressure within in the interior 18 exceeds the pressure threshold, the excess pressure is released such that the pressure within the interior 18 is reduced to at and/or below the pressure threshold. In an example embodiment, the pressure release assembly 30 is similar to that described in U.S. Pat. No. 8,869,829, issued Oct. 28, 2014, the content of which is hereby incorporated herein in its entirety by reference. In an example embodiment, the pressure release assembly 30 is similar to that described in U.S. Pub. No. 2018/0332994, filed May 17, 2018, the content of which is hereby incorporated herein in its entirety by reference.

FIG. 2 illustrates a cross-sectional view of a pressure release assembly 30 according to an example embodiment.

The pressure release assembly 30 is coupled to the lid 20 such that a pressure outlet tube 320 passes through an opening 28 in the lid 20.

A filtering cap 390 is disposed on the underside of the lid 20 (e.g., the surface of the configured to face the interior 18 of the base 10 when the lid 20 is in the closed position 120). The filtering cap 390 is configured to prevent food from clogging the intake tube 310 and/or pressure outlet tube 320. In various embodiments, the filtering cap 390 is made of a food grade material, such as stainless steel, aluminum, plastic, and/or the like. In various embodiments, the filtering cap 390 comprises a mesh 392 configured to enable steam to move substantially freely through the mesh 392 while substantially preventing food particles from passing through the mesh 392. In an example embodiment, the filtering cap 390 is generally reverse dome-shaped, forming a region 394 about the opening of the intake tube 310 that is substantially free of food particles.

The intake tube 310 is also located on the underside of the lid 20. The intake tube 310 is in fluid communication with the interior 18 of the base 10 when the lid 20 is in the closed position 120. For example, the intake tube 310 is in fluid communication with the region 394 formed by the filtering cap 390 and that is substantially free of food particles, in various embodiments.

The intake tube 310 is also in fluid communication with a pressure outlet tube 320 that extends through the opening 28 of the lid 20. A first end 322 of the pressure outlet tube 320 is in fluid communication with the intake tube 310. A pressure outlet portion 330 is disposed at a second end 324 of the pressure outlet tube 320. The second end 324 of the pressure outlet tube 320 is opposite the first end 322 of the pressure outlet tube 320. In an example embodiment, the locking key 396 is configured to secure the intake tube 310 and/or the pressure outlet tube 320 with respect to the lid 20 (e.g., such that the pressure outlet tube 320 is secured at least partially within opening 28).

In various embodiments, the pressure outlet portion 330 comprises a pressure opening 332 that is configured to be selectively sealed by a valve plunger 350. As shown in FIG. 2, an internal pressure release casing 340 is configured to be connected to the pressure outlet portion 330. The internal pressure release casing 340 comprises a spring casing 342 and a plunger cavity 334, in various embodiments. The valve plunger 350 is disposed within the plunger cavity 334, in various embodiments.

In various embodiments, the valve plunger 350 comprises a shaft portion 352 and a beveled valve end 354. The plunger cavity 334 and the valve plunger 350 are configured such that the beveled valve end 354 is aligned with the opening 332 of the pressure outlet portion 330 when the valve plunger 350 is disposed within the plunger cavity 334. The beveled valve end 354 is configured to seal the opening 332 of the pressure outlet portion 330 when a sufficient force is applied thereto to seat a portion of the beveled valve end 354 against a perimeter of the opening 332. In various embodiments, the beveled valve end 354 is made of a pliable and/or elastic material such that the beveled valve end 354 can form an airtight seal of the opening 332 when an appropriate force is applied thereto. In an example embodiment, the force applied thereto is a spring force caused by a coil spring 360 disposed within the spring casing 342 and coupled to the valve plunger 350.

In various embodiments, a coil spring 360 is disposed within the spring casing 342. A first spring end 362 of the coil spring 360 is coupled to the valve plunger 350. In an example embodiment, the first spring end 362 of the coil spring 360 is coupled to the valve plunger proximate the beveled valve end 354. For example, the coil spring 360 is configured to, via the coupling of the first spring end 362 of the coil spring 360 to the valve plunger 350, apply a force to the valve plunger 350 that maintains the beveled valve end 354 in a sealing position with regard to the opening 332 of the pressure outlet portion 330. For example, in an example embodiment, the coil spring 360 is configured to apply a downward force that is substantially equivalent to the product of the (user-configurable) threshold pressure multiplied by the area of the sealing surface 356 of the beveled valve end 354. The area of the sealing surface 356 is determined based at least in part on the area of the surface of the beveled valve end 354 that is exposed to (upward) pressure that is within the bounds of the opening 332 when the beveled valve end 354 is sealing the opening 332.

The coil spring 360 further comprises a second spring end 364 that is opposite the first spring end 362. In an example embodiment, the second spring end 364 is coupled to an external pressure release casing 370. In an example embodiment, the second spring end 364 is coupled to the valve plunger 350.

In various embodiments, the external pressure release casing 370 extends around at least a portion of the internal pressure release casing 340. For example, the external pressure release casing 370 is external to the internal pressure release casing 340. For example, in various embodiments, the external pressure release casing 370 is at least partially annular in cross-sectional shape in a horizontal plane and/or otherwise configured such that the internal pressure release casing 340 is disposed partially within the external pressure release casing. In an example embodiment, the external pressure release casing 370 is movable (e.g., rotatably moveable) with respect to the internal pressure release casing 340. For example, in an example embodiment, an internal surface of the external pressure release casing 370 comprising threads 376 configured to mate with threads 346 on an external surface of the internal pressure release casing 340 such that the relative (vertical) position of the external pressure release casing 370 and the internal pressure release casing 340 may be changed by rotating the external pressure release casing 370 with respect to the internal pressure release cashing 340.

In various embodiments, changing the relative (vertical) position of the external pressure release casing 370 and the internal pressure release casing 340 causes the coil spring 360 to be compressed and/or stretched (with respect to the length of the spring prior to the (vertical) moving of the external pressure release casing 370 with respect to the internal pressure release casing 340). For example, the valve plunger 350 is coupled to the external pressure release casing 370 such that when the position of the external pressure release casing 370 is changed with respect to the internal pressure release casing 340, the position of the valve plunger 350 also changes. As the coil spring 360 is coupled to the valve plunger 350, the change in position of the valve plunger 350 causes the coil spring 360 to be compressed and/or stretched (with respect to the length of the spring prior to the (vertical) moving of the external pressure release casing 370 with respect to the internal pressure release casing 340).

Due to the compressing and/or stretching of the coil spring 360 the force that the coil spring 360 applies to the valve plunger 350 increases and/or decreases (with respect to the force applied by the coil spring 360 to the valve plunger 350 prior to the (vertical) moving of the external pressure release casing 370 with respect to the internal pressure release casing 340). As such, the user may change the relative (vertical) position of the external pressure release casing 370 with respect to the internal pressure release casing 340 (e.g., by rotating the external pressure release casing 370 with respect to the internal pressure release casing 340 such that the external pressure release casing 370 moves along a path defined by the respective mating threads 376, 346) to change the (user-configurable) threshold pressure.

In various embodiments, a surface of the internal pressure release casing 340 comprises indicia 380 (e.g., 380A, 380B, 380C) configured to indicate to a user a set, user-selected, and/or user-configured threshold pressure and/or threshold pressure range. For example, based on which of the indicia 380 is revealed by the external pressure release casing 370 and/or which of the indicia 380 is intersected by a plane defined by the indicating surface 372 and/or that is substantially level with the indicating surface 372 of the external pressure release casing 370, the user may determine and/or infer the set, user-selected, and/or user-configured threshold pressure and/or threshold pressure range. For example, a first indicia 380A corresponds to a first threshold pressure and/or first threshold pressure range, a second indicia 380B corresponds to a second threshold pressure and/or second threshold pressure range, and a third indicia 380C corresponds to a third threshold pressure and/or third threshold pressure range, in the illustrated embodiment. A plane defined by the indicating surface 372 intersects the third indicia 380C, indicating that the current set, user-selected, and/or user-configured threshold pressure and/or threshold pressure range is the third threshold pressure and/or third threshold pressure range. In various embodiments, the indicating surface 372 is one of a top surface or a bottom surface of the external pressure release casing 370.

Example Spring-Loaded Hinge Assembly

When a pressure cooker cools, the pressure in the interior 18 of the pressure cooker can fall below that of the ambient pressure of the environment surrounding the pressure cooker. This can make moving the lid 20 from the closed position 120 to the open position 110 difficult (e.g., due to a small vacuum effect). Thus, a technical problem exists regarding how to enable a user to easily move the lid between the closed position 120 and the open position 110 in such instances while not preventing the lid 20 from being easily moved from the open position 110 to the closed position 120.

Various embodiments provide technical solutions to these technical problems. In particular, in various embodiments, the pressure cooker comprises a spring-loaded hinge assembly 40 configured to enable a user to move the lid 20 between the closed position 120 and the open position 110 without use of excessive force, while not substantially inhibiting the moving of the lid 20 from the closed position 120 to the open position 110.

FIG. 3 illustrates an example embodiment of a spring-loaded hinge assembly 40. In various embodiments, the spring-loaded hinge assembly 40 is configured to hingedly connect the lid 20 to the base 10. In various embodiments, the spring-loaded hinge assembly 40 is configured to reduce the amount of force a user need to apply to move the lid 20 from the closed position 120 to the open position 110 and to not substantially hinder a user from moving the lid 20 from the open position 110 to the closed position 120.

In various embodiments, the spring-loaded hinge assembly 40 comprises at least one first bracket 410. For example, in the illustrated embodiment, the spring-loaded hinge assembly comprises two first brackets 410. Various embodiments may include more than two or only one first bracket 410. Each of the first brackets 410 is coupled and/secured to the at least one sidewall 14 of the base 10. For example, the first brackets 410 couple and/or secure the spring-loaded hinge assembly 40 to the base 10. In various embodiments, the at least one first bracket 410 is coupled and/or secured to the at least one sidewall 14 via one or more fasteners, welding, being integrally formed with the at least one sidewall 14, and/or the like. In an example embodiment, the at least one first bracket 410 comprises a first tensioning bar 412. For example, in the illustrated embodiment, the first tensioning bar 412 extends between and is coupled and/or secured to each of the two first brackets 410.

In various embodiments, the spring-loaded hinge assembly 40 further comprises at least one second bracket 440. The illustrated embodiment comprises two second brackets 440. Various embodiments may include additional second brackets 440 and/or only one second bracket 440. Each of the second brackets 440 is coupled and/secured to the lid 20. For example, the second brackets 440 couple and/or secure the spring-loaded hinge assembly 40 to the lid 20 (e.g., an exterior surface 22 of the lid 20). In various embodiments, the at least one second bracket 440 is coupled and/or secured to the lid 20 via one or more fasteners, welding, being integrally formed with the lid 20, and/or the like. In an example embodiment, the at least one second bracket 440 comprises a second tensioning bar 442. For example, in the illustrated embodiment, the second tensioning bar 442 extends between and is coupled and/or secured to each of the two second brackets 440.

In various embodiments, a spring axle 420 is configured to hingedly couple and/or connect the at least one first bracket 410 to the at least one second bracket 440. For example, in an example embodiment, the spring axle 420 is fixedly coupled to the at least one first bracket 410. For example, in the illustrated embodiment, the spring axle 420 extends between the two first brackets 410 and passes through a respective axle opening in each of the second brackets 440 such that each of the second brackets can rotate with respect to the spring axle 420. In another embodiment, the spring axle may be fixedly coupled and/or secured to the at least one second bracket 440 and rotationally coupled to the at least one first bracket 410. In particular, as the at least one first bracket 410 is (fixedly) coupled to the base 10 and the at least one second bracket 440 is (fixedly) coupled to the lid 20, the fixed coupling of the spring axle 420 to one of the at least one first bracket 410 or the second bracket 440 and rotatable coupling to the other of the at least one second bracket 440 or the first bracket 410 causes the lid 20 to be hingedly coupled to the base 10 such that the lid 20 is moveable between the open position 110 and the closed position 120 (and vice versa).

The spring-loaded hinge assembly 40 further comprises at least two hinge springs 430 (e.g., first hinge spring 430A and second hinge spring 430B). Each hinge spring 430 comprises a respective coil of material 432 forming a respective central opening 433. In various embodiments, the central opening 433 extends along a spring axis and has a cross-sectional shape that is substantially circular in a plane that is perpendicular to the spring axis. Each of the at least two hinge springs 430 is disposed such that the spring axle 420 extends along the respective spring axis through the respective central opening 433. For example, the coil of material 432 of a hinge spring 430 is coiled about the spring axle 420.

Each hinge spring 430 comprises a respective first coil end 434 (e.g., 434A, 434B) and a respective second coil end 436 (e.g., 436A, 436B). The respective first coil end 434 of each hinge spring 430 rests against and/or is engaged with the first tensioning bar 412. For example, the first coil end 434A of the first hinge spring 430A rests against and/or is engaged with the first tensioning bar 412 and the first coil end 434B of the second hinge spring 430B rests against and/or is engaged with the first tensioning bar 412. The respective second coil end 436 of each hinge spring rests against and/or is engaged with the second tensioning bar 442. For example, the second coil end 436A of the first hinge spring 430A rests against and/or is engaged with the second tensioning bar 442 and the second coil end 436B of the second hinge spring 430B rests against and/or is engaged with the second tensioning bar 442. The first and second tensioning bars 412, 442 are configured such that the first and second coil ends 434, 436 of each hinge spring 430 form an angle θ therebetween, when the lid 20 is in the closed position 120. In various embodiments, the angle θ is between 180 degrees and 90 degrees, when the lid 20 is in the closed position 120. In various embodiments, the angle θ is between 150 and 100 degrees (e.g., approximately 130 to 110 degrees, approximately 120 degrees, and/or the like), when the lid 20 is in the closed position 120.

In various embodiments, the first and second hinge springs 430A, 430B are disposed such that the first coil ends 434A, 434B are located proximate one another and the second coil ends 436A, 436B are spaced apart from another (e.g., by the combined length of the first and second hinge springs 430A, 430B). For example, the first hinge spring 430A and the second hinge spring 430B are mirror symmetric and/or have reflection symmetry with respect to a plane take perpendicular to the spring axle 420 and disposed between the first hinge spring 430A and the second hinge spring 430B.

FIGS. 4 and 5 provide various views of another example embodiment of a spring-loaded hinge assembly 40 with a divider 450 disposed between the first hinge spring 430A and the second hinge spring 430B. For example, in the embodiment illustrated in FIGS. 4 and 5, the first end 434A of the first hinge spring 430A and the first end 434B of the second hinge spring 430B are separated by a divider 450. In an example, embodiment, the first end 434A of the first hinge spring 460A engages, rests against, and/or is in physical contact with both the first tensioning bar 412 and respective surface of the divider 450 and the first end 434B of the second hinge spring 430B engages, rests against, and/or is in physical contact with both the first tensioning bar 412 and respective surface of the divider 450. In various embodiments, the divider 450 provides additional support to the first tensioning bar 412 and the first bracket 410. In various embodiments, the divider is approximately 10 mm to 60 mm wide. For example, the distance between the first end 434A of the first hinge spring 430A and the first end 434B of the second hinge spring 430B, which is primarily filled by the divider 450, is in a range of approximately 10 mm to 60 mm, in various embodiments.

In various embodiments, the at least one first bracket 410, at least one second bracket 440, spring axle 420, first tensioning bar 412, second tensioning bar 442, and/or divider 450 are formed of metal and/or some other rigid material that is resilient at temperatures usually experienced by a pressure cooker 100 and/or other cookware.

In various embodiments, the hinge springs 430 apply a force to the first tensioning bar 412 and the second tensioning bar 442 that, aided by a force applied to the lid by a user, cause the lid 20 to move between the closed position 120 and the open position 110. In various embodiments, the force applied to the first tensioning bar 412 and the second tensioning bar 442 is not sufficient to cause the lid 20 to move between the closed position 120 and the open position 110 without additional force being applied (e.g., by a user). However, in an example embodiment, the force applied to the first tensioning bar 412 and the second tensioning bar 442 by the first and second hinge springs 430A, 430B is nearly equal to the force required to open the lid 20, such that a user may apply a minimal force to cause the lid to move between the closed position 120 and the open position 110. Thus, the spring-loaded hinge assembly 50 aids a user in opening the lid 20 without substantially hindering the user from closing the lid 20.

Example Clamping assembly

When the pressure in the interior 18 of the pressure cooker 100 is used to cook food and/or perform processes at high temperature and high pressure, the pressure in the interior 18 of the pressure cooker 100 increases above the ambient pressure of the environment surrounding the pressure cooker 100. This increase in pressure in the interior 18 of the pressure cooker 100 causes the lid 20 to experience a force (e.g., from the increased pressure within the interior 18 of the pressure cooker 100) that, if not counteracted, would cause the lid 20 to move from the closed position 120 to the open position 110. Thus, there is a technical problem regarding how to maintain the lid 20 in the closed position 120 when the pressure cooker 100 is used to cook food and/or perform other processes at high temperature and high pressure.

Various embodiments provide technical solutions to these technical problems by providing a clamping mechanism configured to maintain the lid 20 in the closed position when the clamping assembly 50 is engaged such that clamping assembly 50 causes the lid 20 and base 10 to form a seal therebetween such that the pressure within the interior 18 of the pressure cooker 100 can be increased to at least the threshold pressure and/or threshold pressure range. Moreover, various embodiments provide a clamping assembly comprising a pivotable toggle pad that provides an easier way for a user to tighten the clamping assembly into the locked arrangement. Additionally, various embodiments provide the advantage of enabling the clamping of the lid 20 the base 10 using an engagement element that extends perpendicular to the lid flange but which can be moved so as to not hinder the opening of the lid 20 when in the unlocked arrangement.

FIG. 6A illustrates an example clamping assembly 50 in a locked arrangement 52 where the clamping assembly 50 is maintain the lid 20 in the closed position 120. The clamping assembly 50 is configured such that, when in the locked arrangement 52, the clamping assembly 50 prevents the lid 20 from moving from the closed position 120 to the open position 110 even when the pressure within the interior 18 of the pressure cooker 100 is significantly increased with respect to the ambient pressure in the environment surrounding the pressure cooker 100. FIG. 6B illustrates the example clamping assembly 50 in a unlocked arrangement 54, and FIG. 6C illustrates the example clamping assembly 50 in an released arrangement 56.

In various embodiments, when the clamping assembly 50 is in the locked arrangement 52, the clamping assembly 50 is configured to engage the lid flange 26 and press the lid flange 26 against the base flange 16 such that a seal is formed therebetween. The base flange has a surface 16*a* that is pressed against a surface 521*a* of a first arm 521 of the C-shaped bracket 520. In various embodiments, a sealing element (e.g., a rubber, elastic, and/or other deformable, and/or resilient sealing element) and/or sealing groove 24 may be implemented and/or included as part of the lid flange 26 and/or base flange 16 to increase the ability of the sealing of the lid flange 26 against the base flange 16 to maintain an increased pressure within the interior 18 of the pressure cooker 100. In various embodiments, the combined height B of the lid flange 26 and the base flange 16 is greater than the height A of the narrow portion 516 of the through hole 512, where the combined height B and the height A are both measured in a direction substantially parallel to the elongation axis 515.

In various embodiments, the clamping assembly 50 comprises a clamp bracket 510 coupled to the at least one sidewall 14 of the base 10 of the pressure cooker 100. The clamp bracket comprises a through hole 512 that defines a through axis 513 and an elongation axis 515. In the illustrated embodiment, the through axis 513 is perpendicular to the plane in which the cross-sectional views shown in FIGS. 6A, 6B, and 6C are taken. In the illustrated embodiment, the elongation axis 515 is in the plane in which the cross-sectional views shown in FIGS. 6A, 6B, and 6C were taken (e.g., the elongation axis 515 is perpendicular to the through axis 513). In a cross-section of the through hole 512 taken in a plane perpendicular to the through axis 513, the through hole 512 comprises a wide portion 514 and a narrow portion 516 aligned along the elongation axis 515.

In an example embodiment, the clamp bracket 510 comprises a slot 518 into which a first arm 521 of the C-shaped bracket 520 is disposed. For example, the slot 518 is in a plane substantially parallel to the plane in which the cross-sections shown in FIGS. 6A, 6B, and 6C are taken. In an example embodiment, the slot 518 has a width that is substantially the same as the width of the first arm 521 of the C-shaped bracket 520. In various embodiments, the width of the slot 518 (e.g., in the direction defined by the through axis) is at least as wide as the first arm 521 of the C-shaped bracket 520 and no more than 10 mm wider than the first arm 521 of the C-shaped bracket 520. For example, the clamp bracket 510 comprises two wings 511 that extend out from the at least one sidewall 14 with the slot 518 therebetween, in an example embodiment.

In various embodiments, the clamping assembly 50 further comprises a C-shaped bracket 520. The C-shaped bracket 520 comprises a first arm 521 that is coupled to and/or integrally formed with a first end of a bracket spine 522, the bracket spine 522, and a second arm 523 that is coupled to and/or integrally formed with a second end of the bracket spine 522. The first arm 521 is configured to mounted within the slot 518 of the clamp bracket 510 via a clamp axle 524. For example, a central portion 584 of the clamp axle 524 may be secured within an axle shaft 529 through the first arm 521 of the C-shaped bracket 520. In an example embodiment, the clamp axle 524 is fixedly secured within the axle shaft 529 such that the clamp axle 524 cannot rotate with respect to the C-shaped bracket 520. When the C-shaped bracket 520 is coupled to the clamp bracket 510 via the clamp axle 524, the axle shaft 529 extends in a direction substantially parallel to the through axis 513.

In various embodiments, the clamp axle 524 selectively-rotationally couples the C-shaped bracket 520 to the clamp bracket 510. In particular, the clamp axle 524 extends a length L in a direction substantially parallel to the through axis 513 that is sufficient to extend through a first wing 511, through the first arm 521, and through a second wing 511 such that the C-shaped bracket 520 is coupled to the clamp bracket 510 thereby.

As shown in FIG. 6D, a cross-section of the clamp axle 524 taken in a plane perpendicular to the through axis 513 defines first dimension D1 and a second dimension D2 within the plane where the first dimension is larger than the second dimension. In particular, the first and second dimensions are configured such that, when the clamp axle 524 is disposed within the wide portion 514 of the through hole 512, the clamp axle 524 can rotate. However, when the clamp axle 524 is disposed within the narrow portion 516 of the through hole 512, the clamp axle 524 is not able to rotate. For example, in an example embodiment, the second dimension D2 is substantially the same and/or up to a few millimeters smaller than the width of the narrow portion 516 of the through hole 512 (measured in a direction that is perpendicular to both the through axis 513 and the elongation axis 515) and the first dimension D1 is larger than the width of the narrow portion 516. However, both the first dimension D1 and the second dimension D2 are substantially the same as or less than the width of the wide portion 514 of the through hole 512 (measured in a direction that is perpendicular to both the through axis 513 and the elongation axis 515).

In various embodiments, the cross-section of the clamp axle 524 may have a variety of shapes. For example, the cross-section of the clamp axle 524 may be square, triangular, hexagonal and/or another polygon such that the corners of the square, triangle, hexagon, and/or other polygon prevent the rotation of the clamp axle 524 when the clamp axle 524 is disposed within the narrow portion 516 of the through hole 512 but the width of the wide portion 514 is sufficient to enable rotation of the clamp axle 524.

In the illustrated embodiment shown in FIG. 6D, the clamp axle 524 comprises a first end 582A, a central portion 584, and a second end 582B. The cross-section of the central portion 584 is circular and/or elliptical and the cross-sections of the first and second ends 582A, 582B are truncated circles or ellipses characterized by the first dimension D1, which is the diameter of the circular cross-section of the central portion 584 or the major/minor axis of the elliptical cross-section of the central portion 584, and the second dimension D2, which is less than the diameter of the circular cross-section of the central portion 584 or the major axis of the elliptical cross-section of the central portion 584.

As shown in FIG. 6A, when the clamping assembly 50 is in the locked arrangement 52, the clamp axle 524 is disposed within the narrow portion 516 of the through hole 512 such that the C-shaped bracket 520 cannot rotate with respect to the lid 20 and/or the base 10. For example, in the locked arrangement 52, the C-shaped bracket is fixedly coupled to and/or non-rotatably engaged with the clamp bracket 510 and the base 10 and/or lid 20. As shown in FIGS. 6B and 6C, when the clamping assembly 50 is in the unlocked arrangement 54 and the released arrangement 56, the clamp axle 524 is disposed within the wide portion 514 of the through hole 512 such that the C-shaped bracket 520 is free to rotate with respect to the lid 20 and/or the base 10. For example, when in the unlocked arrangement 54 and the released arrangement 56, the C-shaped bracket 520 is rotatably coupled to and/or rotatably engaged with the clamp bracket 510 such that the C-shaped bracket 520 can rotate between the unlocked arrangement 54 and the released arrangement 56.

In general, the unlocked arrangement 54 and the released arrangement 56 are similar; however, in the released arrangement 56, the C-shaped bracket 520 has been rotated so that the engagement element 530 does not inhibit the movement of the lid 20 between the closed position 120 and the open position 110, or vice versa. In the unlocked arrangement 54, the C-shaped bracket and/or the engagement element 530 (e.g., a handle) may interfere with the movement of the lid 20 between the closed position 120 and the open position 110, or vice versa. In various embodiments, the unlocked arrangement 54 is an intermediary arrangement that is passed through as the clamping assembly 50 is adjusted from the released arrangement 56 to the locked arrangement 52, or vice versa.

In various embodiments, the clamping assembly 50 comprises an engagement element 530. In various embodiments, the engagement element 530 is coupled to the second arm 523 of the C-shaped bracket 520. In various embodiments, the engagement element 530 comprises a user engagement portion 532, an adjusting component 534 (e.g., a rod), and a toggle pad 536.

In various embodiments, the second arm 523 of the C-shaped bracket 520 comprises an arm hole 526. The adjusting component 534 extends through the arm hole 526 such that the user engagement portion 532, secured to a first end of the adjusting component 534 is located on one side of the second arm 523 and the toggle pad 536, secured to a second end of the adjusting component 534, is located on a second side of the second arm 523. In various embodiments, the arm hole 526 is configured to control the passage of the adjusting component 534 through the arm hole 526. For example, the adjusting component 534 may comprise threads that mate with corresponding threads on the interior of the arm hole 526. For example, in various embodiments, the adjusting component 534 is a threaded rod or bolt. In another example, the adjusting component 534 may comprise ratchet notches and the interior of the arm hole 526 may comprise a ratchet mechanism configured to engage with the ratchet notches.

In various embodiments, a user may interact with (e.g., rotate) the user engagement portion 532 to adjust the length of the adjusting component 534 disposed between the second arm 523 and the lid flange 26. For example, the user may interact with the user engagement portion 532 to cause the controlled movement of the adjusting component 534 through the arm hole 526. For example, in various embodiments, the user engagement portion 532 comprises a handle.

In various embodiments, the toggle pad 536 is configured to engage with the lid flange 26 and apply a downward force thereto, such that, when the clamping assembly 50 is in the locked arrangement 52, the toggle pad 536 engages the lid flange 26 and prevents the lid 20 from being able to move between the closed position 120 and the open position 110. When the toggle pad 536 engages the lid flange 26 and the length of the adjusting component 534 disposed between the second arm 523 and the lid flange 26 is further increased, the C-clamp bracket 520 is pulled upward, causing the clamp axle 524 to be pulled into the narrow portion 516 of the through hole 512, such that the clamping assembly 50 is in the sealed configuration. When the length of the adjusting component 534 is reduced, the clamp axle 524 is able to back into the wide portion 514 of the through hole 512 such that the clamp assembly 50 is in the unlocked arrangement 54 and can be rotated into the released arrangement 56.

FIG. 7 provides an exploded view of an example engagement element 630 comprising a pivotable toggle pad. The engagement element 630 comprises user engagement portion and/or handle 632 which is coupled to one end of an adjusting component 634. The second end of the adjusting component 634 comprises a rounded end 636. The engagement element 630 further comprises toggle pad 640. The toggle pad 640 comprises an engagement surface 644 and a receiving chamber 642. The receiving chamber 642 comprises angled and/or curved walls 646. The receiving chamber 642 is configured to receive and/or maintain at least a portion of the rounded end 636 of the adjusting component 634 therein. The angled and/or curved walls 646 of the receiving chamber 642 enable the rounded end 636 to pivot, rotate, and/or the like within the receiving chamber.

In an embodiment wherein the adjusting component 634 is a threaded rod or bolt, as the user rotates the user engagement portion 632 to cause the length of the adjusting component 634 disposed between the second arm 523 and the lid flange 26 to increase, the toggle pad 640 need not move or rotate with respect to the lid flange 26. For example, the user need not apply a force to the user engagement portion 632 that must also overcome the friction between the engagement surface 644 of the toggle pad 640 in addition to the force required to rotate the adjusting component 634 through the arm hole 526. This may also result in less wear and tear on the engagement surface 644 of the toggle pad 640.

Additionally, in the illustrated embodiment of the example engagement element 630, the toggle pad 640 is able to pivot with respect to the user engagement portion 632 and/or the adjusting component 634 to accommodate changes in the angle of the lid 20 and/or the lid flange 26 during the transition between the locked arrangement 52 and the unlocked arrangement 54, or vice versa.

In an example embodiment, the toggle pad 640 is configured to be coupled to a threaded adjusting component 634 via the threads of the adjusting component and corresponding threads of a coupling mechanism of the toggle pad 640.

In various embodiments, the engagement surface 644 of the toggle pad 640 of the engagement element 630 is planar. In various embodiments, the engagement surface 644 of the toggle pad 640 of the engagement element 630 is concave. In an example embodiment, the engagement surface 644 of the toggle pad 640 comprises an at least partially flexible and/or resilient material (e.g., a soft and/or deformable plastic, a polymer, a rubbery polymer, rubber, and/or the like). In such an embodiment where the engagement surface 644 of the toggle pad 640 comprises an at least partially flexible and/or resilient material and the engagement surface 644 is concave (when not engaged with the lid 20) the topology of the engagement surface 644 may change to a more planer topology and/or less concave topology when the engagement element 630 is transitioned from an unlocked arrangement to a locked arrangement.

In an example embodiment, the ability of the toggle pad 640 to pivot and/or rotate with respect to the adjusting component 634 is confined to a predefined toggle range. In an example embodiment, the predefined toggle range is approximately 5-20 degrees. In an example embodiment, the predefined toggle range is approximately 5 to 10 degrees. In an example embodiment, rounded end 636 of the adjusting component 634 comprises one or more pegs extending therefrom that are disposed within corresponding recesses and/or notches within the toggle pad 640 (e.g., in the walls 646 of the receiving chamber 642). In various embodiments, the one or more pegs and the one or more recesses and/or notches are configured to confine the pivoting and/or rotation of the toggle pad 640 with respect to the adjusting component 634 to within the predefined toggle range.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A pressure cooker comprising:

a base comprising a bottom and at least one sidewall extending from a perimeter of the bottom, a base flange extending about a perimeter of the at least one sidewall opposite the bottom, the bottom and the at least one sidewall defining, at least in part, an interior of the base; and a lid hingedly coupled to the base such that the lid is moveable between an open position that allows access to the interior of the base and a closed position that prevents access to the interior of the base, the lid comprising a lid flange about its perimeter;

wherein the pressure cooker further comprises:

a pressure release assembly;

a spring-loaded hinge assembly; and a clamp assembly, wherein the pressure release assembly comprises:

an intake tube in communication with the interior of the base when the lid is in the closed position, a pressure outlet tube in communication with the intake tube at a first end thereof and having a pressure outlet portion at a second end thereof, the first end opposite the second end, an internal pressure release casing configured to be connected to the pressure outlet portion and comprising a spring casing and a plunger cavity, a valve plunger comprising a shaft portion and a beveled valve end, the beveled valve end aligned with an opening of the pressure outlet portion when the valve plunger is disposed within the plunger cavity, a coil spring disposed within the spring casing and coupled at a first spring end to the valve plunger, and an external pressure release casing coupled to a second spring end of the coil spring and disposed external to the internal pressure release casing, the external pressure release casing and the internal pressure release casing coupled to one another via respective mated threads;

wherein the spring-loaded hinge assembly comprises:

at least one first bracket coupled to the at least one sidewall and comprising a first tensioning bar, a spring axle coupled to the at least one first bracket, at least two hinge springs, each of the at least two hinge springs comprising a respective coil of material forming a respective central opening, the respective coil of material having a first coil end and a second coil end, wherein the first coil end and the second coil end extend out from the coil of material, the at least two hinge springs being disposed such that the spring axle extends through the respective central opening of each of the at least two hinge springs and such that the first coil end of a first of the at least two hinge springs and the first coil end of a second of the at least two hinge springs rest proximate one another against the first tensioning bar, and at least one second bracket coupled to an exterior surface of the lid and hingedly coupled to the at least one first bracket via the spring axle such that the at least one second bracket and the lid coupled thereto are moveable between the open position and the closed position, the at least one second bracket comprising a second tensioning bar, the at least two hinge springs being disposed such that the second coil end of the first of the at least two hinge springs and the second coil end of the second of the at least two hinge springs rest spaced apart from one another against the second tensioning bar; and wherein the clamp assembly comprises:

a clamp bracket coupled to the at least one sidewall of the base, the clamp bracket comprising a through hole that defines a through axis and an elongation axis, the shape of the through hole in a plane perpendicular to the through hole axis comprising a wide portion and a narrow portion, the wide portion and the narrow portion aligned along the elongation axis in which the wide portion is located below the narrow portion, a clamp axle extending in a first direction that is substantially parallel to the through hole axis, a cross-section of the clamp axle taken perpendicular to the first direction having a first dimension and a second dimension, the second dimension being smaller than the first dimension such that when the clamp axle is disposed within the through hole of the clamp bracket, the clamp axle can rotate when the clamp axle is disposed within the wide portion of the through hole and the clamp axle cannot rotate when the clamp axle is disposed within the narrow portion of the through hole, a C-shaped bracket comprising a first arm and coupled to the clamp bracket by the clamp axle such that the C-shaped bracket is rotatably engaged with the clamp bracket when the clamp axle is disposed within the wide portion of the through hole and is non-rotatably engaged with the clamp bracket when the clamp axle is disposed within the narrow portion of the through hole, and a handle configured to engage a surface of the lid flange, the handle being selectively moveable so as to cause the C-shaped bracket to be positioned such that the clamp axle is disposed in the narrow portion of the through hole, thereby causing the clamp assembly to be in a locked arrangement and so as to enable the C-shaped bracket to be positioned such that the clamp axle is disposed in the wide portion of the through hole, thereby allowing the clamp assembly to be in an unlocked arrangement or a released arrangement, and wherein a surface of the first arm of the C-shaped bracket is configured to press against a surface of the base flange.

2. The pressure cooker of claim 1, wherein the narrow portion of the through hole of the clamp bracket extends a height A along the elongation axis and the lid flange and the base flange define a combined height B along the elongation axis, with the combined height B being greater than the height A.

3. The pressure cooker of claim 1, wherein the handle comprises a user engagement portion, a rod, and a toggle pad, wherein the user engagement portion is coupled to a first end of the rod, a second end of the rod is a rounded end, the rounded end is disposed within a receiving chamber of the toggle pad, and the receiving chamber has curved or angled walls.

4. The pressure cooker of claim 1, wherein the handle comprises a rod coupled to a toggle pad such that the toggle pad is able to pivot and/or rotate with respect to the rod.

5. The pressure cooker of claim 4, wherein the pivoting and/or rotating of the toggle pad with respect to the rod is confined to a predefined toggle range.

6. The pressure cooker of claim 4, wherein the rod is a threaded rod.

7. The pressure cooker of claim 6, wherein the rod is disposed at least partially within an arm hole in a second arm of the C-shaped bracket, the arm hole having a threaded interior surface configured to mate with the threads of the rod.

8. The pressure cooker of claim 7, wherein transitioning the clamping assembly between the locked arrangement and the unlocked arrangement and/or released arrangement comprises rotating the rod with respect to the C-shaped bracket to adjust a length of the rod disposed between the second arm of the C-shaped clamp bracket and the lid flange.

9. The pressure cooker of claim 4, wherein the toggle pad comprises an engaging surface that is configured to engage the exterior surface of the lid, and wherein the engaging surface has a concave topology.

10. The pressure cooker of claim 9, wherein a topology of the engaging surface is configured to change from the concave topology when the engagement surface is not engaged with the exterior surface of the lid to a planar topology when the engagement surface is engaged with the exterior surface of the lid.

* * * * *